United States Patent [19]
Niwa et al.

[11] Patent Number: 5,632,835
[45] Date of Patent: May 27, 1997

[54] LAMINATED GLASS AND PREPARATION THEREOF

[75] Inventors: Hideyuki Niwa, Saitama; Yasuhiro Morimura, Tokyo; Hiromi Ohtsuru, Tokyo; Kyoei Yoshida, Tokyo; Itsuo Tanuma, Saitama; Kazuo Naitoh, Kanagawa, all of Japan

[73] Assignee: Bridgestone Corporation, Tokyo, Japan

[21] Appl. No.: 888,817

[22] Filed: May 27, 1992

[30] Foreign Application Priority Data

| Jun. 7, 1991 | [JP] | Japan | 3-136583 |
| Jun. 7, 1991 | [JP] | Japan | 3-136584 |
| Jun. 7, 1991 | [JP] | Japan | 3-136585 |
| Jun. 7, 1991 | [JP] | Japan | 3-136586 |

[51] Int. Cl.$^6$ ............................................. C03C 27/10
[52] U.S. Cl. .................... 156/99; 428/422.8; 428/440; 428/441; 428/442
[58] Field of Search ........................ 428/422.8, 440, 428/441, 442, 483; 156/99

[56] References Cited

U.S. PATENT DOCUMENTS

| 4,388,119 | 6/1983 | Uchiyama | 106/316 |
| 4,600,627 | 7/1986 | Honda et al. | 428/203 |
| 5,094,918 | 3/1992 | Niwa et al. | 428/440 |

FOREIGN PATENT DOCUMENTS

| 0160510 | 11/1985 | European Pat. Off. |
| 0246329 | 11/1987 | European Pat. Off. |
| 0396349 | 11/1990 | European Pat. Off. |
| 0434269 | 6/1991 | European Pat. Off. |
| 57-196747 | 12/1982 | Japan |
| 60-226436 | 11/1985 | Japan |
| 61-48536 | 10/1986 | Japan |
| 64-413 | 1/1989 | Japan |
| 3-183645 | 8/1991 | Japan |

*Primary Examiner*—D. S. Nakarani
*Attorney, Agent, or Firm*—Kanesaka & Takeuchi

[57] ABSTRACT

A laminated glass is composed of glass plates, between which a thermosetting resin composed of a copolymer of ethylene-vinyl acetate, a hydrocarbon resin and an organic peroxide is inserted and cured to intergrate them. An organic resin film is inserted between layers of the thermosetting resin. The thermosetting resin contains dibenzylidene sorbitol and/or tribenzylidene sorbitol. The thermosetting resin contains one or more kinds of silane coupling agent selected from the group consisting of acryloxy group containing compound, methacryloxy group containing compound and aryl group containing compound, and an absorber for ultra violet ray are contained. Preparation of the thermosetting resin is carried out by previously mixing a part of the copolymer of ethylene-vinyl acetate with the hydrocarbon resin to obtain a mixture, mixing residual amount of the copolymer of ethylene-vinyl acetate into the mixture, and adding the organic peroxide to mix.

2 Claims, 3 Drawing Sheets

LAMINATED GLASS AND PREPARATION THEREOF

BACKGROUND OF THE INVENTION

1. Field of the Invention

The present invention relates to a laminated glass and preparation thereof used for front glass or side glass of a car, and window glass of a building.

2. Description of the Related Art

There has been generally used a resin of polyvinyl butyral as an intermediate layer of laminated glass, wherein there have been following problems as thermoplastic resin:

1. The glass plates are slipped with each other, or foams are generated by heat after laminating, drived from comparative low softing point of polyvinyl butyral.

2. The laminated glass is gradually whitened from periphery thereof, and adhesion power of glass plate is lowered by exposing in a high humidity atmosphere for a long period of use, which is drived from property of the resin easily affected by moisture.

3. Character of impact resistance of the resin depends upon temperature thereof, pierce resistance is lowered rapidly, particularly, at higher than room temperature, such as higher than 30 degree C.

In order to solve the above problems of resin of polyvinyl butyral, the present inventors provided a laminated glass prepared by providing a thermosetting resin of ethylene-vinyl acetate copolymer to which an organic peroxide is added, between glass plates, and thermosetting the resin to cure and to integrate them; which was applied as a patent application (for example: Japanese Unexamined Patent Publication No. 57-196747).

Further, the present inventors provided a laminated glass prepared by inserting a film composed of an organic resin between the intermediate layers of glass plates to improve impact and pierce resistance thereof, and to make design onto the film or to give character of reflecting and absorbing heat ray by coloring onto the film; which was applied as a patent application (Japanese Unexamined Patent Publication No. 60-226436). The laminated glass utilizes a very high adhering power of the intermediate layer of resin of polyvinyl butyral to the glass and the film of organic resin.

A laminated glass improved in impact and pierce resistance by using a thermosetting resin of ethylene-vinyl acetate copolymer with addition of a hydrocarbon resin and an organic peroxide was provided, and applied as a patent application (Japanese Unexamined Patent Publication No. 3-183645).

As problems of conventional laminated glass, however, it is pointed out that:

First problem: when the laminated glass is given a strong impact power so as to rupture glass, for instance, in using for front glass of a car, impact onto a head of a driver is too large, or it has large resiliency as structure material of the laminated glass;

Second problem: when an oraganic resin film is inserted into an intermediate layer of glass plates, it is expected to give an effect of sound insulating glass, however, it is pointed out that so large effect cannot be expected. Recently, it is recognized as an important item that a comfortable driving circumstances can be formed by insulating sound of out door, such as sound of engine, by using the laminated glass for car, and a comfortable residing circumstances can be formed by insulating sound of out door and in door also by using the laminated glass as window glass.

In transparency of the laminated glass, it is no problem in using as a laminated glass for construction, however, in using it for a front glass of car requiring a high transparency, it remains a little room to improve.

It was provided that dibenzylidene sorbitol and/or tribenzylidene sorbitol can be used as additive to improve transparency of polyolefin resin,(Jananese Examined Patent Publication No.61-48536, and No. 64-413), however, that is addition of dibenzylidene sorbitol and/or tribenzylidene sorbitol into thermoplasic resin of polyolefin, and the transparency of the improved compsition is only 20% order in haze value, giving not so satisfied use of it in laminated glass.

The above-mentioned laminated glass of prior application (Japanese Unexamined Patent Publication No. 3-183645) can have original properties of laminated glass, such as, a high safety, hard to pierce by impact of a material, hard to splinter, and prevention from invader and thief into building, however, recently desired functions of glass, such as, prevention from ultra violet ray which is desired in a recent high quality and intelligent building and residence, that is, inhibition of furniture, curtain, carpet and mat from colour fade-out, and protection of exhibiting goods in show window, cannot be expected.

It is an object of the present invention to solve the above-mentioned problems of conventional art and prior art, and to provide a laminated glass having a small impact onto human body when the glass is used as window glass of a building or a car, and having an excellent function of sound insulation and sound proof.

Another object of the present invention is to provide a laminated glass having an excellent impact and peirce resistance, a high safety, and a superior transparency.

A futher object of the present invention is to provide a laminated glass having an excellent impact and peirce resistance, and a superior absorbing property for ultra violet ray.

A futher object of the present invention is to provide a method for easily and efficiently preparing laminated glass having an excellent impact and peirce resistance, and a high safety, in a high productivity.

SUMMARY OF THE INVENTION

The laminated glass of the first invention is characterized in that a laminate composed of at least two layers of a thermosetting resin and an inermediate layer of an organic resin film inserted between the two layers, is provided between glass plates and cured to integrate them.

The laminated glass of the second invention is characterized in that a thermosetting resin is provided between glass plates, and cured to integrate them, wherein the thermosetting resin is composed of a copolymer of ethylene-vinyl acetate, a hydrocarbon resin, an organic peroxide, and dibenzylidene sorbitol and/or tribenzylidene sorbitol.

The laminated glass according to the second invention is chracterized in that amount of dibenzylidene sorbitol and/or tribenzylidene sorbitol is 0.01 to 3 parts by weight based on 100 parts by weight of the copolymer of ethylene-vinyl acetate.

In the course of studying to solve the above-mentioned problems, it has been found that transparency of the lamintaed glass is improved by using at least one of dibenzylidene sorbitol and tribenzylidene sorbitol into the thermosetting resin of copolymer of ethylene-vinyl acetate with addition of a hydrocarbon resin and an organic peroxide, and the present invention is accomplished.

The lamintaed glass absorbing ultra violet ray of third invention is characterized in that a thermosetting resin is provided between glass plates, and cured to integrate them, wherein the thermosetting resin is composed of a copolymer of ethylene-vinyl acetate with addition of one or more compound selected from the group consisting of a hydrocarbon resin, an organic peroxide, an acryloxy containing compound, a methacryloxy compound, and an aryl group containing compound, and further with a silane coupling agent, and ultra violet absorber.

Preparation of the laminated glass of the present invention comprising: adding a hydrocarbon resin and an organic peroxide into a copolymer of ethylene-vinyl acetate to give a thermosetting resin, providing the resin between glass plates, and curing the resin to integrate them; is characterized in that the thermosetting resin is prepared by mixing a part of the copolymer of ethylene-vinyl acetate and the hydrocarbon resin, adding the residual part of the copolymer of ethylene-vinyl acetate into the mixture, and then adding the organic peroxide.

When the thermosetting resin composed of the copolymer of ethylene-vinyl acetate, hydrocarbon resin, and organic peroxide is used in a laminated glass, it gives an excellent impact and peirce resistance to the laminated glass, by an effect of addition of the hydrocarbon resin.

Further, impact for human body can be small by a material, and function of sound insulation and sound proof can be improved, by providing an organic resin film between such thermosetting layers. Further, a laminated glass may have multifunction of decorative property, absorbing heat ray, reflectivity, and conductivity, by giving design, coloring, and metal thin film onto the organic film.

Transparency of the laminated glass can be remarkably improved by adding dibenzylidene sorbitol and/or tribenzylidene sorbitol into such thermosetting resin; further, the laminated glass is improved in absorbing property for ultra violet by adding an agent for absorbing ultra violet too.

The hydrocarbon resin can not be easily and efficiently mixed into a desired amount of copolymer of ethylene-vinyl acetate at a time, since the resin has a high viscosity.

However, according to the present invention, the compounds can be rapidly mixed, by mixing previously a part of the copolymer of ethylene-vinyl acetate and the hydrocarbon resin, adding the residual part of the copolymer of ethylene-vinyl acetate into the mixture, and then adding the organic peroxide.

DETAILED DESCRIPTION OF PREFRRED EMBODIMENTS

Figure 1:
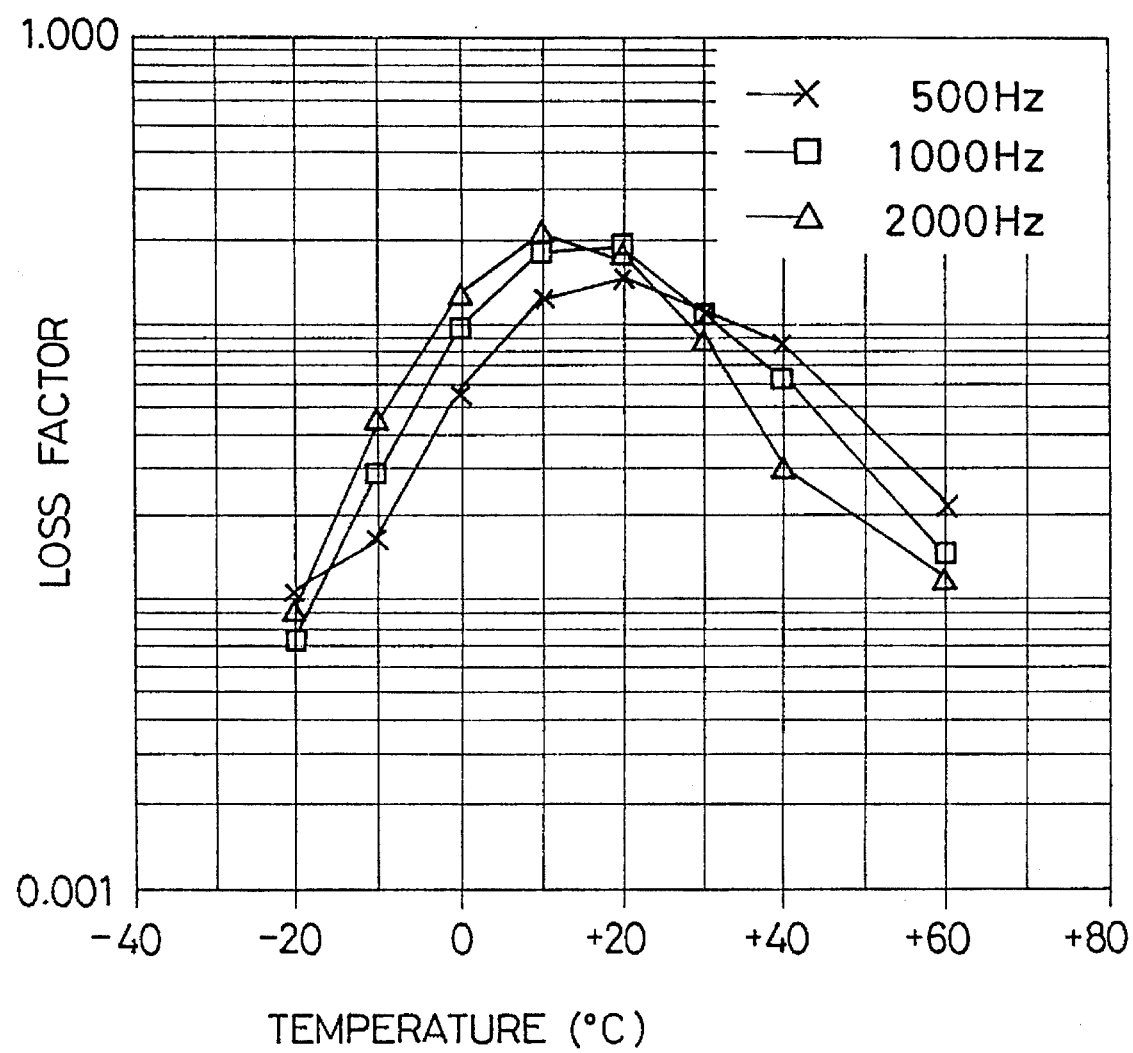
FIG. 1 illustrtes a graph of results of measurment of loss factors of the laminated glass in Example 1.

Detail of the present invention is described as follows.

In the present invention, the copolymer of ethylene-vinyl acetate is composed of 10% to 50%, more preferably 15% to 40% by weight of vinyl acetate. When the content of vinyl acetate is less than 10% by weight, transparency of the resin obtained by cross linking to cure at a high temperature is not satisfied; when that is more than 50% by weight, impact and peirce resistance of the laminated glass is deteriorated. The hydrocarbon resin used in the present invention can be natural or synthetic resin. The natural resin is preferably rosin, derivative of rosin, or terpene resin. The rosin is preferably gum resin, tall oil resin, wood resin. The derivative of rosin is preferably the above rosin which is hydrogenated, dismutated, polymerized, etherificated, or made metal salt, respectively. The terpene resin is preferably alpha-pinene, beta-pinene, or terpenephenol resin. The other natural resin, such as dammar, copal and shellac can be used. The synthetic resin is preferably petroleum resin, phenol resin and xylene resin. The petroleum resin is preferably aliphatic-, alicyclic-, coplymer-, hydrogenated- or pure-monomer-petroleum resin. The phenol resin is preferably alkyl- or modified-phenol resin. The xylene resin is pure xylene resin or modified xylene resin.

Number average molecular weight of the hydrocarbon resin is preferably 200–50000, more preferably 200 to 10000.

Amount of such hydrocarbon resin is preferably 1 to 100. parts by weight or more preferably 2–80 parts by weight based on 100 parts by weight of the copolymer of ethylene-vinyl acetate, respectively.

The organic peroxide is used as a curing agent of copolymer of ethylene-vinyl acetate, which is decomposed at a temperature higher than 100 degree C. to give a radical.

Decomposition temperature of the organic peroxide corresponding half-value period of 10 hours is preferably higher than 70 degree C., from the view point of stability in mixing it. Examples of the organic peroxide are preferably 2,5-dimethylhexane-2,5-dihydro-peroxide, 2,5-dimethyl-2,5-di(t-butylperoxy)hexane-3, di-t-butylperoxide, t-butylcumyl-peroxide, 2,5-dimethyl-2,5-di(t-butylperoxy)hexane, dicumylperoxide, α, α'-bis(t-butylperoxyisopropyl)benzene, n-butyl-4,4-bis(t-butylperoxy)valate, 2,2-bis(t-butylperoxy)butane, 1,1-bis(t-butylperoxy)cyclohexane, 1,1-bis(t-butylperoxy)3,3,5-trimethylcyclohexane, t-butylperoxybenzoate, and benzoyl-peroxide; these compounds can be used in single or mixture thereof, of which amount is preferably 0.1–5 parts by weight based on 100 partts by weight of the copolymer of ethylene-vinyl acetate.

In the present invention, amount of the dibenzylidene sorbitol and/or tribenzylidene sorbitol, as an agent for improving transparency, is preferably 0.01 to 3 parts by weight, more preferably 0.05 to 2 parts by weight based on 100 parts by weight of the copolymer of ethylene-vinyl acetate, respectively. When the amount is less than 0.05 parts by weight, a satisfied transparency can not be obtained; when the amount is more than 2 parts by weight, effect corresponding to the amount can not be obtained, and it is uneconomical. Surface of dibenzylidene sorbitol and/or tribenzylidene sorbitol can be treated with at least one kind of higher fatty acid.

The laminated glass prepared by adding such an agent for improving transparency is very suitable for front glass or side glass of a car or window glass of a building, since the laminated glass is superior in impact and pierce resistance, and is very safe in breaking by action of external force and has an excellent transparency.

In the present invention, the agent for absorbing ultra violet known in the art can be used. Compound of benzophenone or benzotriazol is suitable for the agent for absorbing ultra violet, since it does not deteriorate excellent adhesion of the resin and glass plate, and slightly yellowed for a long period of use. Exampls of the agent are compounds of benzophenone such as 2-hydroxy-4-methoxybenzophenone, 2,2'-dihydroxy-4,4'- dimethoxybenzophenone, 2-hydroxy-4-n-dodecyloxybenzophenone, 2,4-dihydrooxybenzophenone, 2,2'-dihydroxy-4-methoxybenzophenone, and compounds of benzotriazol such as 2-[2'-hydroxy-3'-(3",4",5",6"-tetrahydrophthalimide-methyl)-5'-methylphenyl] benzotriazol, and 2-(2'-hydroxy-3',5'-di-t-amylphenyl) benzotriazol.

Amount of such an agent for absorbing ultra violet is preferably not more than 5 parts by weight based on 100 parts by weight of the copolymer of ethylene-vinyl acetate. When the amount is more than 5 parts by weight, it is bled on surface of the resin, bringing a wrong adhesion with glass.

The laminated glass prepared by using such an agent for absorbing ultra violet can be used for a window of a building or residence to inhibit colour fade-out of furniture, curtain, carpet and mat, and can be used for a show window to protect the exhiting commodities, since the laminated glass is superior in impact and pierce resistance, and is very safe in breaking by action of external force and has a function of absorbing ultra violet.

In the present invention, in order to improve initial modulus of the obtained resin and to give a high pierce resistance, an auxiliary curing agent selected from the group consisting of acryloxy group containing compounds, methacryloxy group containing compounds and allyl group containing compounds can be added into the resin. Examples of the acryloxy group containing compounds and methacryloxy group containing compounds are acrylic acid, methacrylic acid, and derivatives thereof, for instance, ester thereof; wherein examples of alcohol residual group in the ester are preferably methyl-, ethyl-, dodecyl-, stearyl-, lauryl-, cyclohexyl-, tetrahydrofurfuryl-, aminoethyl-, 2-hydroxyethyl-, 3-hydroxypropyl- and 3-chloro-2-hydroxypropyl-group. Polyatomic alcohol such as ethylene glycol, triethylene glycol, and polyethylene glycol can be used as an alcohol in the ester.

Examples of the allyl group containing compounds are preferably diallylphthalate, diallylfumarate, diallylmaleate, triallyl isocyanurate and triallyl cyanurate.

Amount of these compounds is preferably not more than 50% by weight based on the copolymer of ethylene-vinyl acetate.

In the present invention, in order to further improve adhesion of the resin of copolymer of ethylene-vinyl acetate to glass, a silane coupling agent known in the art can be added into the resin. Examples of the silane coupling agent are preferably gamma-chloropropylmethyoxy-silane, vinyltrichloro-silane, vinyltriethoxy-silane, vinyl-tris(beta-methoxyethoxy)silane, gamma-methacryloxypropyl-trimethoxy-silane, beta-(3,4-ethyoxycyclohexyl)ethyl-trimethoxy-silane, gamma-glycidoxypropyl-trimethoxy-silane, vinyl-triacetoxy-silane, gamma-mercaptopropyl-trimethoxy-silane, gamma-aminopyopyl-triethoxy-silane, and N-beta-(aminoethyl)-gamma-aminopropyl-trimetoxy-silane.

Amount of these silane coupling agent is preferably not more than 5% by weight based on the copolymer of ethylene-vinyl acetate.

In the present invention, in order to improve stability of the resin, as occasion demands, a polymerization inhibitor, such as hydroquinone, hydroquinone monomethyl ether, p-benzoquinone and methyl-hydroquinone, can be further added into the resin; of which amount is preferably not more than 5% by weight based on the copolymer of ethylene-vinyl acetate.

Further, the other additives, such as, coloring agent, ultra violet absorber, aging inhibitor, and inhibitor for changing color can be added into the resin together with the polymerization inhibitor.

The thermosetting resin in the present invention can be easily prepared by mixing specified amounts of components mentioned above by means of conventional method, however, in the present invention, a part of the necessary amount for producing the resin of the copolymer of ethylene-vinyl acetate is previously mixed with the hydrocarbon resin to give a mixutre (hereinafter referred to as pre-mixture), and the residul amount of the copolymer of ethylene-vinyl acetate is added into the pre-mixture, and then the organic peroxide is added into it.

When the hydrocarbon resin is added into the copolymer of ethylene-vinyl acetate, mixing by means of roll mill can not be done rapidly, since viscosity of the hydrocarbon resin is too high, accordingly, the method of present invention can give a smooth mixing of them.

Amount of the hydrocarbon resin in the pre-mixture is preferably 5–200 parts by weight, more preferably 10–100 parts by weight based on 100 parts by weight of the copolymer of ethylene-vinyl acetate.

The above mentioned additives can be added during mixing the premixture with the organic peroxide.

Preparation of the laminated glass by using the thermosetting resin composed of such components is: making the thermosetting resin by mixing the specified amounts of the components, providing a specified amount of the resin between glass plates, and curing the resin by heating at curing temperature of the resin, to integrate with the glass plates.

In case of inserting the organic resin film between layers of the thermosetting resin, the laminated glass can be prepared by forming sheet of the thermosetting resin by normal method, inserting the organic resin film between the two sheets of the thermosetting resin to give a laminate, providing the laminate between glass plates, and curing the resin to integrate the glass and the organic resin film.

Examples of materials of the above-mentioned organic resin film are preferably polyester, polyvinyl chloride, polyvinylidene chloride, polyethylene, copolymer of ethylene-vinyl acetate, copolymer of saponified ethylene-vinyl acetate, methylmethacrylate, polyvinyl butyral, copolymer of ethylene-ethylacrylate, copolymer of ethylene-methylacrylate, copolymer of ethylene-ethylacrylate cross linked by metal ion, polystyrene, polyurethane, polycarbonate and cellophane.

Most preferable material of the organic resin film is polyester film, from the view point of smoothness of the film, glossiness of surface (required for forming thin film of metal by depositing), strength, and workability.

In the present invention, onto whole or a part of the organic resin film, designs of graphic design, picture, photograph, letters and marks can be given, color to absorb heat ray can be given, or thin film of metal or metal oxide can be deposited to give reflecting heat ray or conductivity. The given designs, coloring and thin film can have an excellent durability, since these films are within the intermediate layer between the laminated glass.

In the present invention, examples of method for forming the thin film of metal or metal oxide are depositing, sputtering, and ion plating. Examples of main component of the thin film of metal or metal oxide are indium oxide, chromium oxide, gold, palladium, tin, cadmium oxide, silver, platium, aluminium, copper, copper iodide, tin oxide, antimony-tin oxide and titanium oxide, which can be used in single or mixture thereof.

In the present invention, in order to give reflecting or absorbing property for heat ray, such thin film of metal or metal oxide as mentioned above can be coated directly onto the glass plate. In this case, a transparent organic resin film can be used.

The laminated glass of the present invention prepared by using the organic resin film can be suitably used for front glass or side glass of a car, and window glass of a building, since it is superior in impact and pierce resistance, and has a mild impact when a material, for instance, human body is collided on it, and has an excellent sound proof.

The present invention is more specifically described and explained by means of the following Examples. It is to be understood that the present invention is not limited to the Examples and various changes and modifications may be made in the invention without departing from the spirit and scope thereof.

Examples of the copolymer of ethylene-vinyl acetate, the hydrocarbon resin and the agent for improving transparency are:

Copolymer of ethylene-vinyl acetate:

"Urutorasen 634" (trade mark) available from Toso Kabushiki Kaisha; content of vinyl acetate=26% by weight;

Hydrocarbon resin:

"Arukon M-100" (trade mark) available from Arakawa Kagaku Kogyo Kabushiki Kaisha; alicyclic hydrocarbon of number average molecular weight: 700;

Agent for improving transparency:

"EC-1-55" (trade mark) available from Ishi Kagaku Kogyo Kabushikikaisha; mixture of dibenzylidene sorbitol and tribenzylidene sorbitol.

Examples of the absorber for ultra violet are:
(A): 2-hydroxy-4-methoxybenzophenone,
(B): 2,2'-dihydroxy-4,4'-dimethoxybenzophenone,
(C): 2-hydroxy-4-n-dodeloxybenzophenone,
(D): 2,4-dihydrooxybenzophenone,
(E): 2,2'-dihydroxy-4-methoxybenzophenone,
(F): 2-hydroxy-4-n-octoxybenzophenone,
(G): 2-[2'-hydroxy-3'-(3",4",5",6"-tetrahydrophthalimide-methyl)-5'-methylphenyl]benzotriazol,
(H): 2-(2'-hydroxy-3',5'-di-t-amylphenyl)benzotriazol.

EXAMPLE 1

The components were mixed at 80 degree C. by means of a roll mill in each amount shown in Table 1 to give each thermosetting resin.

The obtained each thermosetting resin was formed into two sheets of thickness of 0.4 mm by means of a press. A transparent polyester film of thickness of 100 micro meter was inserted between the two sheets to give a laminate. The laminate was inserted between two float glass plates of thickness of 3 mm previously washed and dried to give a laminate. The laminate was put into a rubber bag, deaerated by vacuum, and pre-pressed at 80 degree C. The obtained pre-pressed laminated glass was put into an oven, and heated at 130 degree C. for 30 minutes. All of the obtained laminated glasses had a high transparency and no optical distortion.

The each obtained laminated glass was subjected to following tests. The results are shown in Table 2 and FIG. 2.

1. Falling ball test

A steel ball of weight of 2.25 kg was fallen onto a surface of the each laminated glass from a height shown in Table 2 according to JIS R 3025, and its breaking state was observed. State of piercing by steel ball into the laminated glass, and state of cracking of film in the laminated glass were observed. Height of jumping of the steel ball after colliding on the laminated glass was measured.

2. Sound proof test

The obtained laminated glass was cut into 300 mm×25 mm to give a sample; of which loss factor was measured by means of an apparatus available from (KK) Toyo Tekunika. The frequencies used in the test were 500, 1000 and 2000 Hz respectively. Temperature in the test was from −20 degree C. to +60 degree C. The results are plotted in graph. Sounds of 500 Hz to 2000 Hz are sounds that human ears can be discriminated; which means the larger loss factor is the higher sound proof.

TABLE 1

|  | Example 1 | Comparative Example 1 |
|---|---|---|
| Composition (parts by weight) |  |  |
| Urutorasen 634 | 100 | 100 |
| Arukon M-100 | 30 | — |
| Triallyl-iso-cyanurate | 2 | 2 |
| Gamma-methacryloxypropyl-trimethoxy silane | 0.5 | 0.5 |
| 1,1-bis(t-butyl-peroxy)-3,3,5-trimethyl cyclohexane | 2 | 2 |

TABLE 2

| Ball falling test | | | |
|---|---|---|---|
| Height of falling(m) | Results of Test | Example 1 | Comparative Example 1 |
| 5.5 | State of break | no crack | pierced |
|  | Height of jumping | 30 cm | — |
| 5 | State of break | no crack | no crack |
|  | Height of jumping | 2 cm | 60 cm |

COMPARATIVE EXAMPLE 1

The same procedures as in Example 1 were repeated except that the compsotion was changed into the compsition as in Table 1 to give samples of a laminated glass, which were subjected to tests as same as Example 1. The results are shown in Table 2 and FIG. 2.

From the results of Tables 1 and 2, it is obvious that the laminated glass of the present invention can provide small impact against human body at a collision, since the laminated glass has an excellent rupture resistance at a collision with a material, and has small height of jumping.

Figure 2:
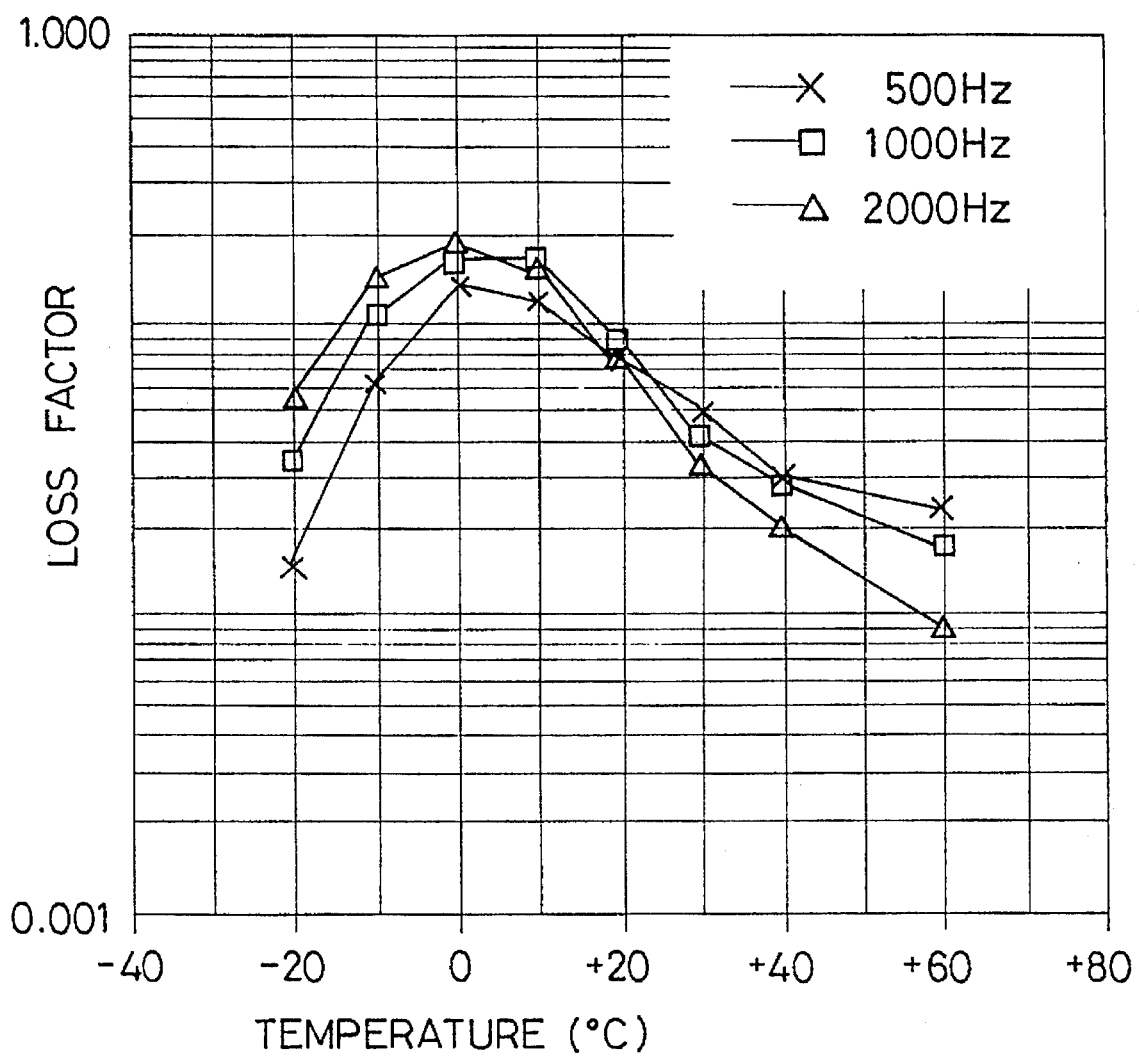
FIG. 2 illustrtes a graph of results of measurment of loss factors of the laminated glass in Comparative Example 1.

From the results of measureed loss factors shown in FIG. 1 and FIG. 2, the loss factors in Example 1 are larger at about 20 degree C. of temperature of residing circumstances in any frequency, and it is obvious that the laminated glass of the present invention has a high effect for sound proof.

From the results of Example 1 and Comparative Example 1, it is obvious that the laminated glass of the present invention inserted with the organic resin film has an excellent impact and pierce resistance, a small impact against human body at a collision by a material, and a superior sound proof.

EXAMPLE 2

The components were mixed at 80 degree C. by means of a roll mill in each amount shown in Table 3 to give each thermosetting resin.

The obtained each thermosetting resin was formed into a sheet of thickness of 0.76 mm by means of a press. The sheet was inserted between two float glass plates of thickness of 3 mm previously washed and dried to give a laminate. The laminate was put into a rubber bag, deaerated by vacuum, and pre-pressed at 80 degree C. The obtained pre-pressed laminated glass was put into an oven, and heated at 130 degree C. for 30 minutes. All of the obtained laminated glass had a high transparency and no optical distortion.

The each obtained laminated glass was subjected to shotbag test according to JIS R3205 (1983), resulting that any crack was not found in all of the four sheets.

The obtained laminated glass was subjected to a transparency test by means of a haze-meter available from Suga Shikenki Kabushiki Kaisha. The result was 0.5% of haze value.

EXAMPLE 3 AND COMPARATIVE EXAMPLE 2

The procedures of Example 2 were repeated except changing compsotion as in Table 3 to give samples of laminated glasses. The each sample was subjected to shotbag test as same as Example 2. The results are shown in Table 3 together with the results of Example 2.

TABLE 3

| | Example 2 | Example 3 | Comparative Example 2 |
| --- | --- | --- | --- |
| Composition (parts by weight) | | | |
| Urutorasen 634 | 100 | 100 | 100 |
| Arukon M-100 | 30 | 30 | 30 |
| EC-1-55 | 0.1 | 1 | — |
| Triallyl-iso-cyanurate | 2 | 2 | 2 |
| Gamma-methacryloxypropyl-trimethoxy silane | 0.5 | 0.5 | 0.5 |
| 1,1-bis(t-butyl-peroxy)-3,3,5-trimethyl-cyclohexane | 2 | 2 | 2 |
| Results of Tests | | | |
| Shotbag test (Height of fallling: 120 cm) | no crack | no crack | no crack |
| Trasparency test (haze-value %) | 0.5 | 0.5 | 0.8 |

From the results mentioned above, it is obvious that according to the present invention, a laminated glass having a high safety and a superior transparency can be obtained. Generally, it is known that haze-value desired in glass for construction is preferably not more than 1.0%, and that for a car is not more than 0.5%, accordingly, the present invention can provide a laminated glass having a satisfied transparency as glass for a car, since the haze-value of the laminated glass can be improved by about 40% of that of conventional laminated glass.

From the results of Example 2, Example 3 and Comparative 2, it is obvious that the laminated glass of the present invention prepared by using the specified agent for improving transparency, can be suitably used for front glass of a car and for window glass of a constructon, since the laminated glass has a superior impact and pierce resistance, a high safety in its breaking by external force, and an excellent tranparency.

EXAMPLE 4 TO 11

The components were mixed at 80 degree C. by means of a roll mill in each amount shown in Table 4 to give each thermosetting resin.

The obtained each thermosetting resin was formed into two sheets of thickness of 0.4 mm by means of a press. A transparent polyester film of thickness of 100 micron meter was inserted between the two sheets to give a laminate. The laminate was inserted between two float glass plates of thickness of 3 mm previously washed and dried to give a laminate. The laminate was put into a rubber bag, deaerated by vacuum, and pre-pressed at 80 degree C. The obtained pre-pressed laminated glass was put into an oven, and heated at 130 degree C. for 30 minutes. All of the obtained laminated glasses had a high transparency and no optical distortion.

The each obtained laminated glass was subjected to following tests. The results are shown in Table 5.

1. impact resistance test:

The laminated glass was subjected to shotbag test according to JIS R3205 (1983). When all of the four same samples were not found any crack in them at falling from a height of 120 cm, it was jugded to be "no crack" and written that into Table 5.

2. transparency test:

Haze-value was measured by means of a haze-meter available from Suga Shikenki Kabushiki Kaisha.

Figure 3:
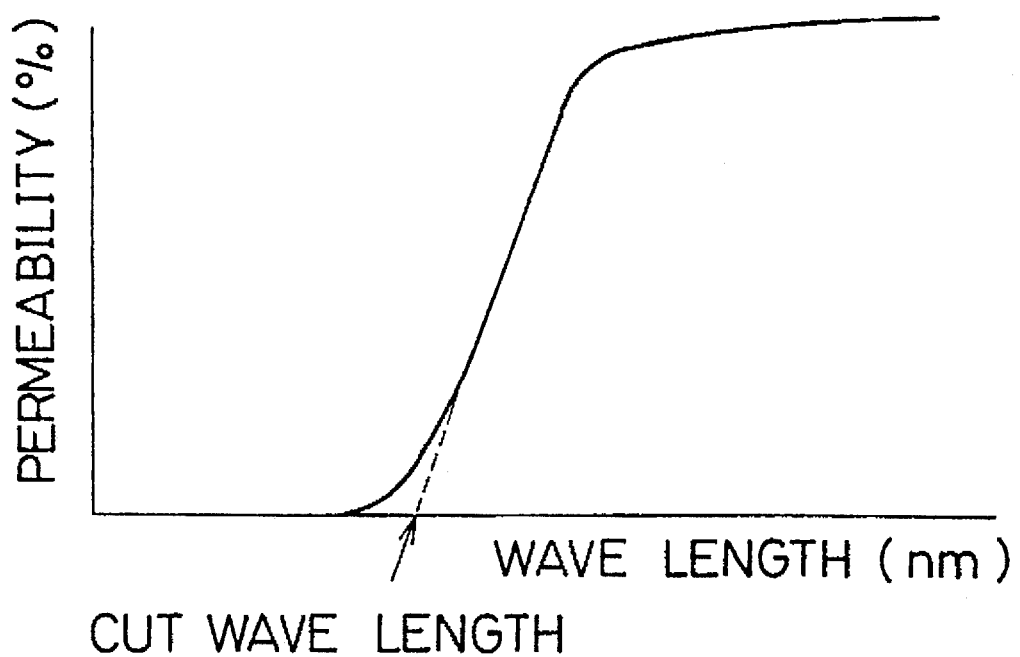
FIG. 3 illustrtes a graph of extrapolating method for UV cut wave length by ultra violet absorption spectrum.

3. transparency test:

UV cut wave length was obtained from ultra violet absorbing spectrum, as shown in FIG. 3.

4. test for changing color by thermal aging

The each sample after measurement of haze-value was cut into two pieces, one of them was heated in an oven heated at 150 deree C. for 5 hr, allowed to stand to cool it, after cooling, the two samples of before and after heating were put onto a white paper, and then degree of yollowing was observed with the naked eyes.

COMPARATIVE EXAMPLE 3

The same procedres as in Example 4 were repeated except that the composition was changed into the composition without using the absorbor for ultraviolet as in Table 4, to obtain a laminated glass. The sample was subjected to the same test as Example 4, the result was shown in Table 5.

From the results in Table 4 and Table 5, it is obvious that the sample of Comparative Example 3 containing no absorbor for ultra violet cannot cut ultra violet ray.

TABLE 4

| Composition (parts by weight) | Example 4 | 5 | 6 | 7 | 8 | 9 | 10 | 11 | Comparative Example 3 |
|---|---|---|---|---|---|---|---|---|---|
| Urutorasen 634 | 100 | 100 | 100 | 100 | 100 | 100 | 100 | 100 | 100 |
| Arukon M-100 | 30 | 30 | 30 | 30 | 30 | 30 | 30 | 30 | 30 |
| Triallyl-iso-cyanurate | 2 | 2 | 2 | 2 | 2 | 2 | 2 | 2 | 2 |
| Gamma-methacryloxypropyl-trimethoxy silane | 0.5 | 0.5 | 0.5 | 0.5 | 0.5 | 0.5 | 0.5 | 0.5 | 0.5 |
| 1,1-bis(t-butyl-peroxy)-3,3,5-trimethyl-cyclohexane | 2 | 2 | 2 | 2 | 2 | 2 | 2 | 2 | 2 |
| Absorber for ultra violet | | | | | | | | | |
| A | 0.5 | — | — | — | — | — | — | — | — |
| B | — | 0.5 | — | — | — | — | — | — | — |
| C | — | — | 0.5 | — | — | — | — | — | — |
| D | — | — | — | 0.5 | — | — | — | — | — |
| E | — | — | — | — | 0.5 | — | — | — | — |
| F | — | — | — | — | — | 0.5 | — | — | — |
| G | — | — | — | — | — | — | 0.5 | — | — |
| H | — | — | — | — | — | — | — | 1.5 | — |

TABLE 5

| | Shotbag test | Haze-Value (%) | Cut wave length(nm) | Changing degree of color |
|---|---|---|---|---|
| Example 4 | no crack | 0.7 | 368 | no changing |
| Example 5 | no crack | 0.7 | 400 | no changing |
| Example 6 | no crack | 0.7 | 365 | no changing |
| Example 7 | no crack | 0.7 | 372 | no changing |
| Example 8 | no crack | 0.7 | 402 | no changing |
| Example 9 | no crack | 0.7 | 365 | no changing |
| Example 10 | no crack | 0.7 | 383 | no changing |
| Example 11 | no crack | 0.7 | 387 | no changing |
| Comparative Example 3 | no crack | 0.7 | — | no changing |

From the results of Examples 1 to 11 and Comparative Example 3, it is obvious that the laminated glass of the present invention absorbing ultra violet ray prepared by using a specified absorber for ultra violet has an excellent impact and pierce resistance of original function of laminated glass, and has a superior function of absorbing ultra violet simultaneously.

EXAMPLE 12

The components were mixed at 140 degree C. by means of a Brabender-plasto mill in each amount shown in Table 6 to give a pre-mixure I. The obtained pre-mixture was mixed with the components of amounts shown in Table 7 by means of a roll mill heated at 80 degree C. to obtain a thermosetting resin.

The obtained thermosetting resin was formed into a sheet of thickness of 0.76 mm by means of a press. The sheet was inserted between two float glass plates of thickness of 3 mm previously washed and dried to give a laminate. The laminate was put into a rubber bag, deaerated by vacuum, and pre-pressed at 80 degree C. The obtained pre-pressed laminated glass was put into an oven, and heated at 130 degree C. for 30 minutes. All of the obtained laminated glass had a high transparency and no optical distortion.

The obtained laminated glass was subjected to shotbag test according to JIS R3205 (1983). Any crack cannot be found in all of the four samples at falling from a height of 120 cm.

The obtained laminated glass was subjected to a transparency test by means of a haze-meter available from Suga Shikenki Kabushiki Kaisha. The result was 0.7% of haze value.

EXAMPLE 13

The same procedres as in Example 12 were repeated except that the components of amounts shown in Table 6 were mixed to obtain a pre-mixture II, and the pre-mixture was mixed with the components of amounts shown in Table 7, to obtain a laminated glass. The obtained laminated glass was subjected to the shotbag test as in Example 12.

The result was "no cracking" in the shotbag test, and haze-value of 0.9%.

TABLE 6

| | | (parts by weight) |
|---|---|---|
| | Example 12 | Example 13 |
| Premixture Composition | I | II |
| Urutorasen 634 | 100 | 100 |
| Arukon M-100 | 50 | 100 |

TABLE 7

| | | (parts by weight) |
|---|---|---|
| | Example 12 | Example 13 |
| Composition | | |
| Premixture I | 90 | — |
| Premixture II | — | 160 |
| Urutorasen 634 | 40 | 20 |
| Triallyl-iso-cyanurate | 2 | 2 |
| Gamma-methacryloxypropyl-trimethoxy silane | 0.5 | 0.5 |
| 1,1-bis(t-butyl-peroxy)-3,3,5-trimethyl-cyclohexane | 2 | 2 |

In Example 12 and Example 13, preparation of the pre-mixtures I and II, and followed preparation of the resins by mixing could be done very smoothly and rapidly. Period of the mixing could be remarkably shortened in comparison with mixing method that all of the components were mixed at a time without preparing pre-mixtures previously.

From the results mentioned above, it is obvious that accoding to the present invention, a laminated glass having a high safety, and an excellent transparency can be produced in a high productivity.

From the results of Example 12 and Example 13, it is obvious that according to the method of the present invention, a laminated glass having a superior impact and pierce resistance, a high safety in its breaking by external force, and suitable to front glass or side glass of a car, and to window glass of a construction can be easily and efficiently produced, by preparation comprising mixing a part of the copolymer of ethylen-vinyl acetate with the hydrocarbon resin, adding the residual amount of the copolymer of ethylen-vinyl acetate to mix into it, and then adding the organic peroxide.

What is claimed is:

1. A method for preparing a laminated glass with a thermosetting resin including a copolymer of ethylene-vinyl acetate, 1–100 parts by weight of a hydrocarbon resin based on 100 parts by weight of said copolymer of ethylene-vinyl acetate, and 0.1–5 parts by weight of an organic peroxide based on 100 parts by weight of said copolymer of ethylene-vinyl acetate, said method comprising mixing a part of said copolymer of ethylene-vinyl acetate with an entire amount of said hydrocarbon resin to form a premixture, a ratio of said copolymer to said hydrocarbon resin being such that said hydrocarbon resin contains 5–200 parts by weight relative to 100 parts by weight of said copolymer, content of vinyl acetate in said copolymer of ethylene-vinyl acetate being 10–50% by weight, adding a residual amount of said copolymer of ethylene-vinyl acetate to the premixture and mixing together so that an entire amount of said copolymer of ethylene-vinyl acetate is completely mixed together at a short period of time, adding to the above mixture an entire amount of said organic peroxide and mixing together to form the thermosetting resin, and applying the thermosetting resin between two glass plates and curing the same to integrally connect the glass plates and the thermosetting resin.

2. A method of claim 1, wherein said hydrocarbon resin has number average molecular weight of 200–50,000.

* * * * *